US010140043B1

(12) United States Patent
Leavy et al.

(10) Patent No.: US 10,140,043 B1
(45) Date of Patent: *Nov. 27, 2018

(54) DIGITAL DATA SANITATION

(71) Applicant: Wickr Inc., San Francisco, CA (US)

(72) Inventors: Thomas Michael Leavy, River Edge, NJ (US); Christopher Howell, Freehold, NJ (US); Robert Statica, Long Valley, NJ (US); Kara Lynn Coppa, Long Valley, NJ (US)

(73) Assignee: Wickr Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/794,123

(22) Filed: Oct. 26, 2017

Related U.S. Application Data

(63) Continuation of application No. 14/314,014, filed on Jun. 24, 2014, now Pat. No. 9,830,089.

(60) Provisional application No. 61/839,302, filed on Jun. 25, 2013.

(51) Int. Cl.
G06F 17/30 (2006.01)
G06F 3/06 (2006.01)
G06F 21/62 (2013.01)

(52) U.S. Cl.
CPC .......... G06F 3/0619 (2013.01); G06F 3/067 (2013.01); G06F 3/0644 (2013.01); G06F 21/62 (2013.01); G06F 2212/7205 (2013.01); G06F 2221/2143 (2013.01)

(58) Field of Classification Search
CPC .. G06F 3/30619; G06F 3/067; G06F 3/30644; G06F 21/62; G06F 3/0644; G06F 2212/7205; G06F 2212/2143; G06F 3/0655
USPC .................................................. 707/692, 694
See application file for complete search history.

(56) References Cited

U.S. PATENT DOCUMENTS

| 5,867,668 | A | 2/1999 | Spirakis et al. |
| 7,526,620 | B1 | 4/2009 | McGovern |
| 8,489,889 | B1 | 7/2013 | Moscaritolo et al. |
| 8,566,350 | B2 | 10/2013 | Chow et al. |
| 8,719,233 | B2 | 5/2014 | Gandhi et al. |
| 9,037,796 | B2 | 5/2015 | Nagpal et al. |
| 9,224,014 | B2 | 12/2015 | Rios et al. |
| 9,830,089 | B1 * | 11/2017 | Statica .................. G06F 3/0623 |
| 2008/0098038 | A1 | 4/2008 | Motoyama |
| 2010/0138619 | A1 | 6/2010 | Benavides |
| 2010/0211541 | A1 | 8/2010 | Deetz et al. |
| 2012/0030183 | A1 | 2/2012 | Deetz et al. |
| 2012/0300331 | A1 | 11/2012 | Deetz et al. |
| 2013/0305057 | A1 | 11/2013 | Greco et al. |
| 2014/0129785 | A1 | 5/2014 | Deetz et al. |

* cited by examiner

Primary Examiner — Vincent F Boccio
(74) Attorney, Agent, or Firm — Christian LaForgia

(57) ABSTRACT

Digital data sanitization is disclosed. An indication that a data sanitization process should be performed is received. The data sanitization process is performed. Performing the data sanitization process includes determining an amount of free space on a storage device. Performing the data sanitization process further includes performing a set of one or more write operations, where performing the write operations decreases the amount of free space on the storage of the device.

18 Claims, 14 Drawing Sheets

DIGITAL DATA SANITATION

CROSS REFERENCE TO OTHER APPLICATIONS

This application is a continuation of U.S. application Ser. No. 14/314,014, entitled "Digital Data Sanitation," filed on Jun. 24, 2014, which claims priority to U.S. Provisional Patent Application No. 61/839,302 entitled "Digital Secure File Shredder," filed on Jun. 25, 2013, both of which are incorporated herein by reference in their entireties. This application also claims priority to U.S. Provisional Patent Application No. 61/846,568 entitled "Digital Security Bubble," filed Jul. 15, 2013, which is incorporated herein by reference in its entirety.

BACKGROUND OF THE INVENTION

Individuals use electronic devices for a variety of reasons, including to author, consume, or otherwise interact with potentially sensitive information. As one example, electronic devices are used to exchange messages between users. Such messages may be of a personal nature, may include confidential business information, and/or may otherwise contain information that users of the devices would like to keep confidential. Unfortunately, even after a user of an electronic device deletes data on that device, that data can often be recovered, such as by a nefarious individual, and/or through forensic analysis. The ease of recovery of deleted information stored on solid state media can be particularly problematic, as existing approaches to neutralizing data are typically based on an assumption that the medium upon which the data is stored is magnetic.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
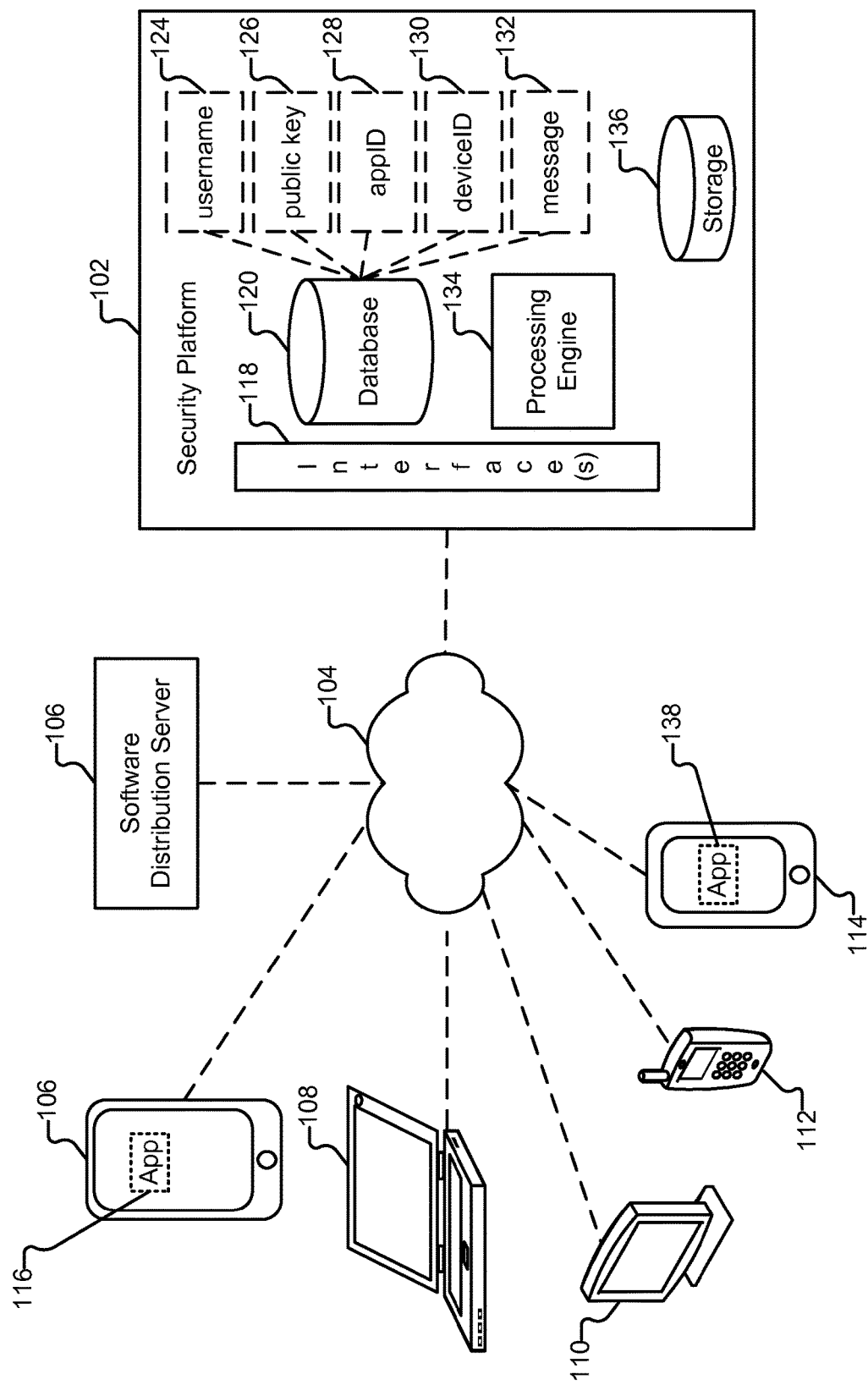
FIG. 1 illustrates an embodiment of an environment in which the exchange of secure communications is facilitated by a security platform.

FIG. 1 illustrates an embodiment of an environment in which the exchange of secure communications is facilitated by a security platform (e.g., security platform 102). In the environment shown in FIG. 1, a "digital security bubble" (DSB), described in more detail below, encapsulates or is otherwise provided around a message. The DSB allows information such as encryption information, hardware binding information, message security controls, and decryption information—for multiple recipients—to securely travel with the message. Further, the DSB provides cross-platform support. For example, techniques described herein can be deployed on a variety of operating systems (e.g., Linux, iOS, and Windows), on a variety of smart phone platforms (e.g., iPhone, Android, Windows, Blackberry, etc.), and on a variety of device types (e.g., mobile smart phones, tablets, laptops, desktops, etc.). Using techniques described herein, only intended accounts on intended devices are able to decrypt the messages. Thus, for example, the security platform is unable to decrypt messages.

Users of client devices, such as client devices 106-114 communicate securely with one another using techniques described herein. As shown in FIG. 1, client devices include personal computers (110), laptop computers (108), tablets (106), and mobile telephony devices (112, 114). Some client devices, e.g., tablet device 106, make use of techniques described herein via a messaging application (also referred to as an "app") obtained from a software distribution server 106. Examples of software distribution servers (which can comprise a single server or multiple servers working in cooperation) include app stores (e.g., provided by Apple, Google, Blackberry, Microsoft, Amazon, and/or other entities) and other webservers offering app downloads. Client devices can also make use of a web interface (e.g., provided by platform 102) instead of or in addition to a dedicated messaging application installed on the device. Other types of devices not depicted in FIG. 1 can also be used in conjunction with the techniques described herein, such as digital cameras, game consoles, video players (e.g., incorporating DVD, Blu-ray, Red Laser, Optical, and/or streaming technologies) and other network-connected appliances, as applicable. As will be described in more detail below, devices, such as the client devices listed above, can be configured to digitally sanitize data—whether or not that data was created in conjunction with the secure messaging techniques described herein.

Communications are exchanged via one or more networks (depicted collectively in FIG. 1 as network cloud 104). Such networks can include wired, wireless, cellular, and satellite networks. And, such networks can be closed/private networks, as well open networks (e.g., the Internet). Further, as used herein, "communications" and "messages" can take a variety of forms, including: text messages, documents, audiovisual files, SMSes, and voice and video calls. Further, in addition to personal, business, or other types of conversations, the content can pertain to electronic transactions such as credit card security, password protection, directories, and storage drive protection, video on demand security, online gaming, gambling, electronic distribution of music, videos, documents, online learning systems, databases, cloud storage and cloud environments, bank transactions, voting processes, military communications, security of medical records, communication between medically implanted devices and doctors, etc. As will be described in more detail below, the exchange of communications is facilitated by security platform 102.

A. Installation/Initialization/Registration

Suppose a user of client device 106 (hereinafter referred to as "Alice") would like to send a secure message to her friend, Bob (a user of client device 114) in accordance with techniques described herein. In some embodiments, in order to send a message Bob, Alice first obtains a copy of a messaging application suitable for her device. For example, if Alice's tablet device runs iOS, she could obtain an "app" for her tablet from the Apple App Store (an example of software distribution server 106). Bob similarly obtains an appropriate application suitable for his client device 114 (e.g., an Android-based smartphone) from an appropriate location (e.g., the Google Play store). In some embodiments, client devices make use of a web-based application (e.g., made available by platform 102 through interface 118), instead of, or in addition to, a dedicated installed application.

Figure 2:
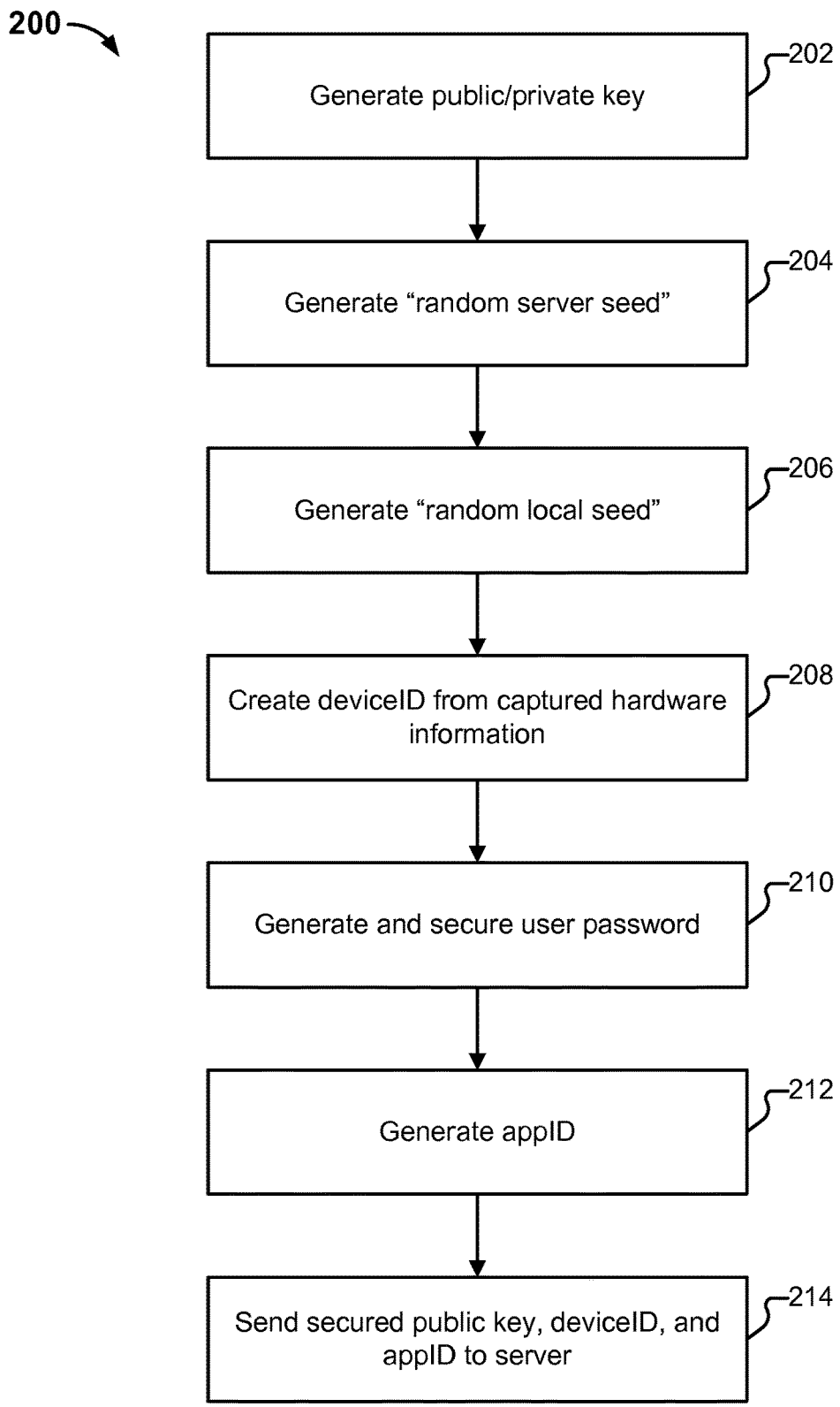
FIG. 2 illustrates an embodiment of an installation and registration process.

Once Alice's tablet 106 has obtained a copy of the messaging app, the app is installed, and Alice is able to register for an account. An instance of a messaging app usable in conjunction with the techniques described herein is depicted in FIG. 1 as app 116 (installed on device 106). Examples of events that can occur during an installation/initialization/registration process (200) are illustrated in FIG. 2 and will now be described.

In some embodiments, process 200 is performed on a client device, such as Alice's client device 106. The process begins at 202 when a public/private keypair for the application is generated, on client device 106 (e.g., using RSA, ECDH, or any other asymmetric encryption algorithms). As one example, the keypair can be generated using Eliptic Curve Algorithm with Diffie Helman Key Exchange (ECDH). Other cryptographic standards can also be used, such as RSA. At 204, a "random server seed" is generated, and at 206, a "random local seed" is generated. The seeds are used in conjunction with cryptographic key generation, and in some embodiments, the seeds are determined based on captured hardware information (described in more detail below).

At 208, a device identifier ("deviceID") is created from captured hardware information. Examples of captured hardware information include: hard drive identifiers, motherboard identifiers, CPU identifiers, and MAC addresses for wireless, LAN, Bluetooth, and optical cards. Combinations of information pertaining to device characteristics, such as RAM, CACHE, controller cards, etc., can also be used to uniquely identify the device. Some, or all, of the captured hardware information is run through a cryptographic hash algorithm such as SHA-256, to create a unique deviceID for the device. The captured hardware information can also be used for other purposes, such as to seed cryptographic functions.

At 210, Alice is asked, via an interface provided by app 116, to supply a desired username. Alice enters "Alice" into the interface. A determination is made as to whether the username is available. As one example, app 116 can supply a cryptographic hash of "Alice" to platform 102 for checking. If platform 102 does not already have a record for that hash, the username "Alice" is available for Alice to use. If platform 102 already has a record of that hash, Alice is instructed by the interface to pick an alternate username. Once Alice has selected an available username, she is asked to supply a password.

At 212, an application identifier ("appID") is created. The appID is a unique identifier for the particular installation of the messaging app. If Alice installs the messaging app on multiple devices, each of her devices will have its own unique appID. (And, each of her devices will also have its own unique deviceID.) In some embodiments, the appID is created by hashing Alice's selected password and other information such as device information.

Finally, at 214 Alice's public key, deviceID, and appID are sent to platform 102 in a secure manner. As one example, in some embodiments app 116 is configured to communicate with platform 102 via TLS. At the conclusion of process 200, Alice is ready to send and receive secure communications, described in Sections C and E below, respectively.

B. Security Platform

As mentioned above, security platform 102 is configured to facilitate the exchange of communications (e.g., among any/all of client devices 106-114). Additional detail regarding various aspects of platform 102 will now be provided.

Security platform 102 includes one or more interface(s) 118 for communicating with client devices, such as client devices 106-114. As one example, platform 102 provides an application programming interface (API) configured to communicate with apps installed on client devices, such as app 116 and app 138. Platform 102 can also provide other types of interfaces, such as a web interface, or stand alone software programs for desktops and laptops, running on various Operating Systems (OSes). The web interface can allow users of client devices such as client devices 108 and 110 to exchange messages securely (whether with one another or other users), without the need for a separately installed messaging application. The stand alone software program allows users to exchange secure messages via software that is downloaded by each user.

Security platform 102 also includes a database 120. Included in database 120 is a record for each user of platform 102. Each record has associated with it information such as the user's public key, deviceID(s), appID(s), and messages. As shown in FIG. 1, database 120 is relational and stores information in a variety of tables, including a table of hashed usernames (124), a table of public keys (126), a table of deviceIDs (128), a table of appIDs (130), and a table of messages (132). Other techniques can also be used to store the information used by platform 102. For example, messages can be stored in a separate storage 136 instead of being stored within database 120.

Finally, security platform 102 includes a processing engine 134 which performs a variety of tasks, including interacting with database 120 on behalf of interface(s) 118. The embodiment of platform 102 depicted in FIG. 1 comprises standard commercially available server hardware (e.g., having a multi-core processor(s), 8G+ of RAM, gigabit network interface adaptor(s), and hard drive(s)) running a typical server-class operating system (e.g., Linux). In various embodiments, platform 102 is implemented across a scalable infrastructure comprising multiple such servers, solid state drives, and/or other applicable high-performance hardware.

Whenever platform 102 is described as performing a task, either a single component or a subset of components or all components of platform 102 may cooperate to perform the task. Similarly, whenever a component of platform 102 is described as performing a task, a subcomponent may perform the task and/or the component may perform the task in conjunction with other components.

C. Sending DSB Secured Messages

Returning back to Alice's desire to send a message to Bob: at the conclusion of Section A above, Alice has successfully registered her username ("Alice") with security platform 102. And, Bob is also a user of platform 102. Suppose Alice would like to send a message to Bob. She starts app 116 and is presented with an interface that includes a "compose" option. Alice selects the compose option and is presented with a message composition interface.

Figure 3:
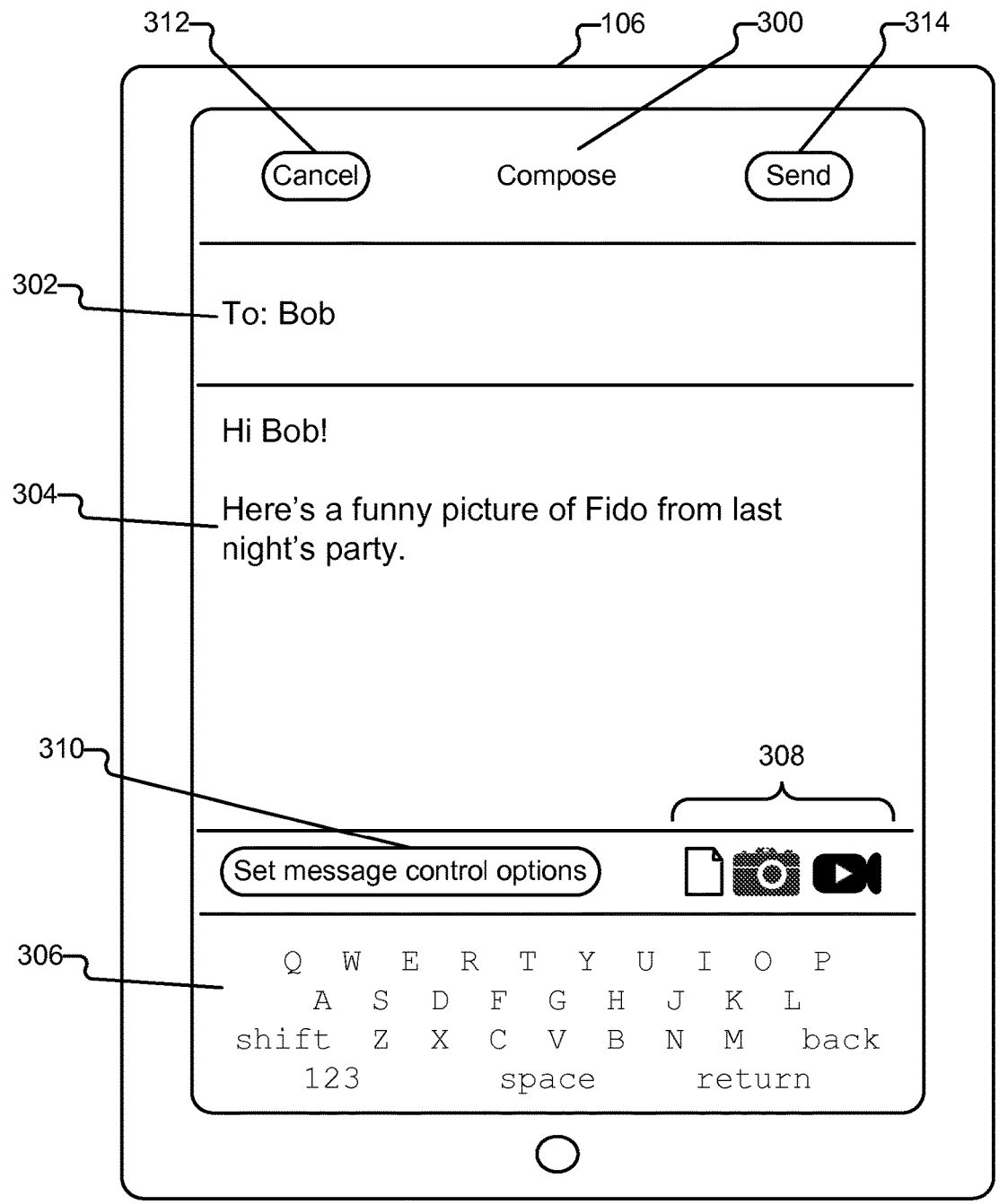
FIG. 3 illustrates an example of an interface.

An example message composition interface is shown in FIG. 3. In particular, FIG. 3 depicts interface 300 as rendered on an example tablet device 106, connected to the Internet via an appropriate connection, such as: 3G, 4G or higher cellular connection, WiFi, Satellite, wireless or wired LANs, Bluetooth, etc. Tablet device 106 includes a touchscreen. An on-screen keyboard is provided for Alice in region 306. Alice can enter the usernames of one or more recipients in region 302. She can enter message text in region 304. Alice can optionally add attachments by interacting with buttons shown in region 308. Examples of attachments include, but are not limited to: documents, pictures, and audiovisual clips. By selecting button 310, Alice can specify various message control options, such as: the lifetime/expiration of the message; on which device(s) it can be unencrypted/read; and sharing, saving, forwarding, recalling, and deleting options.

If Alice is satisfied with her message, she can send it to Bob by clicking the send button (314). If she wishes to cancel out of composing the message, she can click the cancel button (312). Suppose Alice clicks send button (314) after composing the message shown in interface 300. An example of the events that occur, in some embodiments, in conjunction with Alice sending a message is illustrated as process 400 in FIG. 4 and will now be described.

Figure 4:
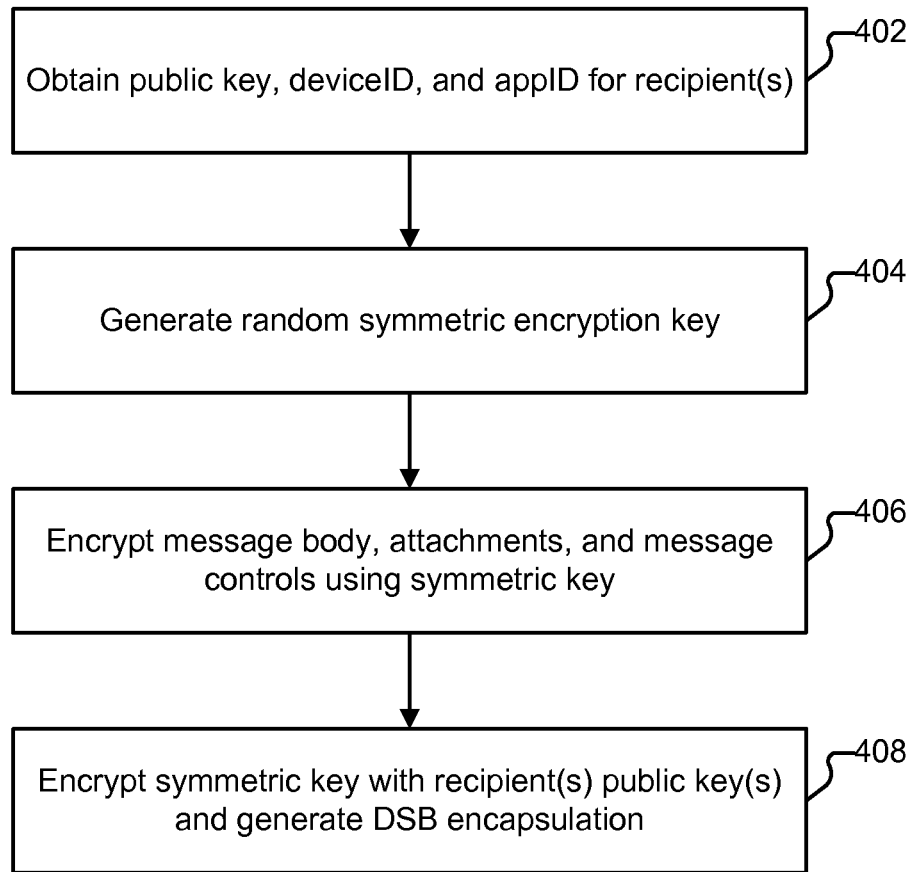
FIG. 4 illustrates an example of a message sending process.

FIG. 4 illustrates an example of a process for sending a DSB-secured message. In some embodiments, process 400 is performed on a client device, such as Alice's client device 106. The process begins at 402 when the public key, deviceID, and appID of a recipient are obtained from platform 102. As will be explained in more detail below, the recipient's public key, deviceID and appID are used in the encryption of the symmetric key used to encrypt data, and in the DSB encapsulation of the message for the hardware/appID binding of the message. As one example, app 116 can request the information from platform 102 via an API (e.g., interface 118). In some embodiments, the information is retrieved when Alice enters the recipient's name into region 302. In other embodiments, the information is retrieved when Alice clicks send button 314, or at any other appropriate time (e.g., while she is composing a message). In the example shown in FIG. 3, Alice is only sending a message to Bob. If she also desires to send the message to other recipients, she can enter their names in region 302 as well, and their respective public keys, deviceIDs, and appIDs will also be retrieved at 402.

At 404, a random symmetric encryption key is generated (e.g., by app 116 on device 106). As one example, the symmetric key is an AES 256 bit key. At 406, the symmetric encryption key is used to encrypt the message body, any attachments, and any message control options. In some embodiments, Alice's own information (e.g., her public key, deviceID(s), and appID(s) are included in the DSB as well. Finally, at 408, the symmetric key is encrypted with the public key of each recipient. A DSB encapsulation is then generated, and contains the aforementioned components. Examples of the DSB format are provided in Section D below.

In some cases, a user may own multiple devices. For example, Bob may be the owner of device 114 and 112, both of which are configured with secure messaging apps. Each of Bob's installations will have its own deviceID and appID. When the DSB is created, each of Bob's devices will be considered a separate device under the same username account.

The generated DSB is securely transmitted to platform 102 (e.g., by being encrypted with a symmetric key shared by the app and platform 102, and also encapsulated by TLS as an additional security layer). Irrespective of how many recipients Alice designates for her message (and, e.g., how many recipients there are or how many devices Bob has), only one DSB will be created and transmitted to platform 102. Upon receipt of the DSB, processing engine 134 opens the DSB and determines the recipients of the message. Specifically, the processing engine 134 performs a match against the deviceIDs (in a cryptographic hash and camouflaged representation) included in the DSB and the deviceIDs stored in database 120 as well as the username (in a cryptographic hash and camouflaged representation) in the DSB and the ones stored in the database 120. A cryptographic hash and camouflaged representation means that the hash algorithm (i.e. SHA256) that is used for the deviceID, username, and appID values, is further camouflaged, in some embodiments, by taking multiple hashes of the result values (i.e. multiple rounds of SHA256 of the previous SHA256 value—i.e. SHA(SHA(SHA(SHA . . . ))). Processing engine 134 also creates an entry for the received DSB in message table 132 and notifies the recipient(s) that a new message is available. In various embodiments, other actions are also performed by platform 102 with respect to the DSB. As one example, platform 102 can be configured to remove the DSB as soon as the recipient successfully downloads it. As another example, platform 102 can enforce an expiration time (e.g., seven days) by which, if the DSB has not been accessed by the recipient, the DSB is deleted. Where multiple recipients are included in a DSB, platform 102 can be configured to keep track of which recipients have downloaded a copy of the DSB, and remove it once all recipients have successfully downloaded it (or an expiration event has occurred).

D. DSB Examples

Figure 5:
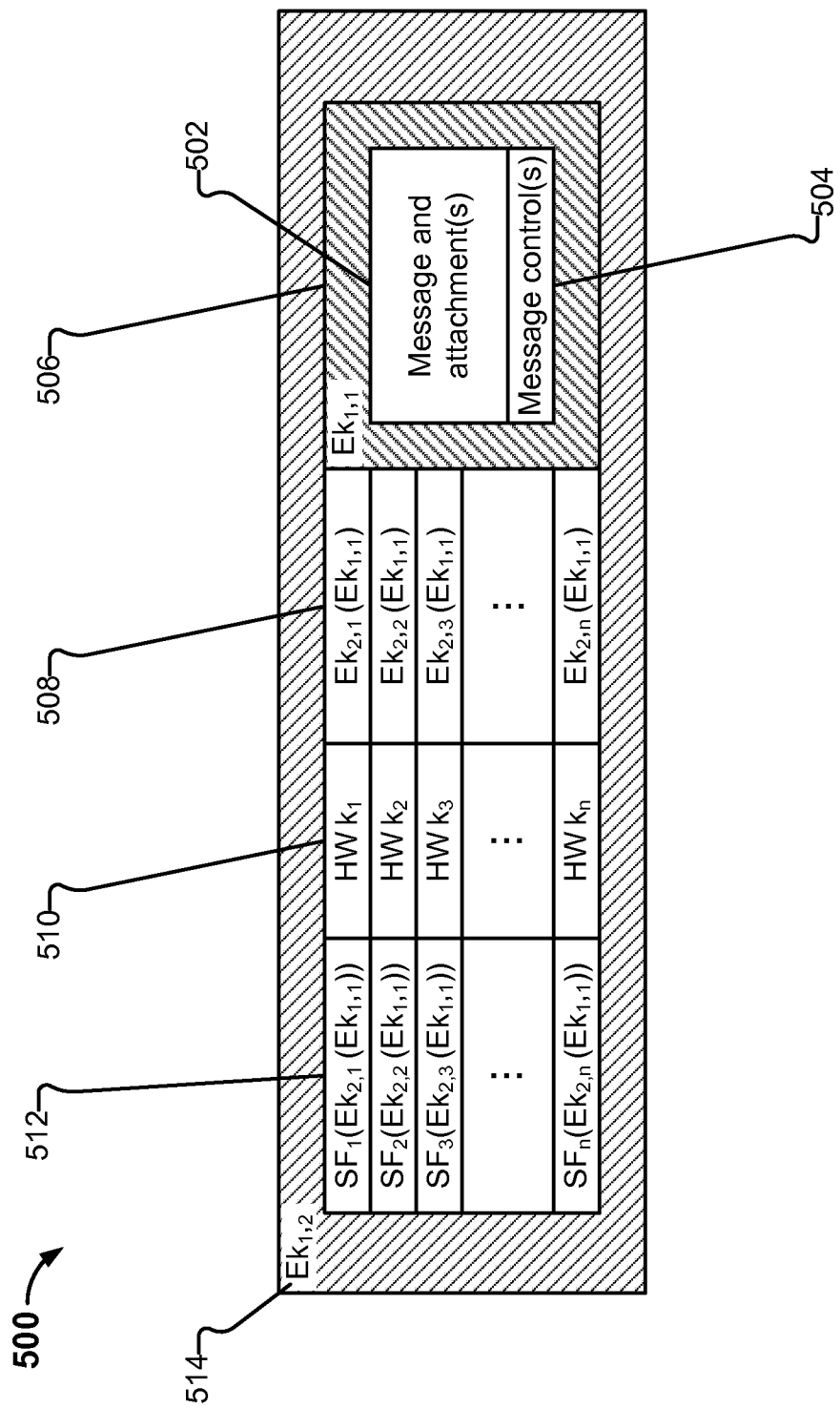
FIG. 5 illustrates an example of a digital security bubble.

FIG. 5 illustrates an example of a digital security bubble (DSB). DSB 500 is an example of output that can be generated by app 116 as a result of executing process 400. In the example shown, DSB 500 includes a message and optional attachments (502), and one or more message controls (504) encrypted with a key $Ek_{1,1}$ (encrypted portion 506). In some embodiments, key $Ek_{1,1}$ is generated by app 116 at portion 404 of process 400. Additional detail regarding portion 506 is shown in FIG. 7, where SSK in FIG. 7 is $Ek_{1,1}$ of FIG. 5 and represents the sender's symmetric shared key used to encrypt the message and attachments.

DSB 500 also includes, for each message recipient 1-$n$, the key $Ek_{1,1}$ encrypted by each of the recipient's respective public keys (as shown in region 508). Further, DSB 500 includes a combination of each recipient's respective deviceID, hashed username, and appID (collectively denoted $HWk_{1-n}$) in region 510. These constituent parts are also referred to herein as "parameters." Additional detail regarding the parameters is shown in FIG. 9—namely, a plurality of parameters (such as hashed username, deviceID, and appID) are encrypted using SK2, which is a symmetric key generated by the client and shared with platform 102.

In some embodiments (e.g., as is shown in FIG. 5), a spreading function is used to spread the encrypted symmetric keys inside the DSB (as shown in region 512), by spreading the bits of the encrypted key in a spreading function generated pattern, with the default function being a sequential block or data. The spreading function also contains the cryptographic hashed representation of the recipient usernames that are used by the server to identify the recipients of the message and to set the message waiting flag for each of them. Finally, the DSB is itself encrypted using key $Ek_{1,2}$ (encrypted portion 514), which is a symmetric key shared between app 116 and platform 102. Additional detail regarding portions 514 and 508 are shown in FIG. 8, where SK1 in FIG. 8 is $Ek_{1,2}$ in FIG. 5 and represents the symmetric encryption key shared by the app and platform 102, and where User$_1$Pubkey in FIG. 8 is $Ek_{2,1}$ in FIG. 5 and represents the recipient's public key (e.g., generated at 202).

Figure 6:
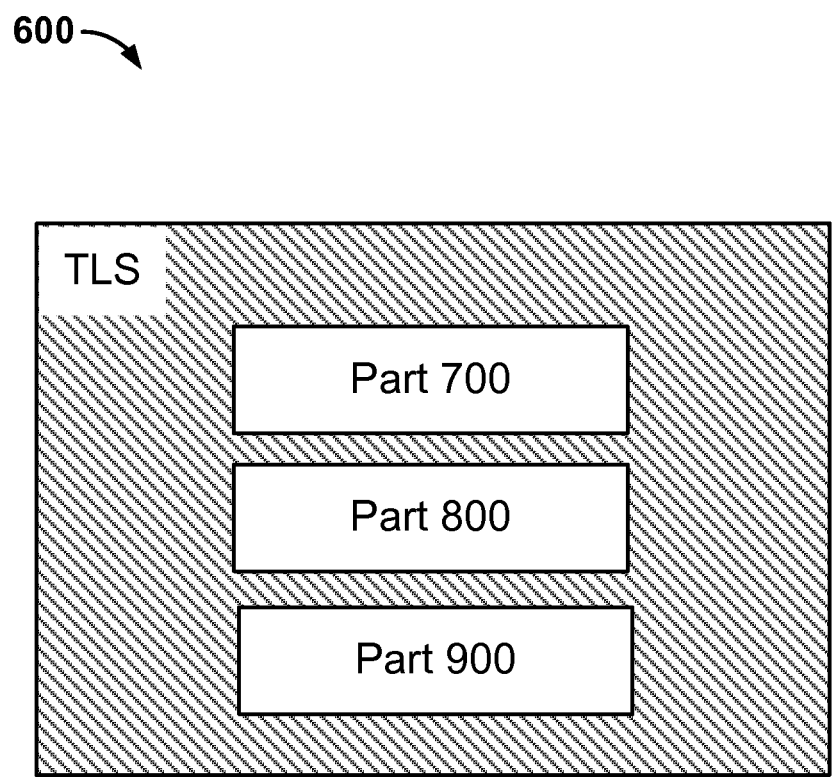
FIG. 6 illustrates an example of a digital security bubble.
Figure 7:
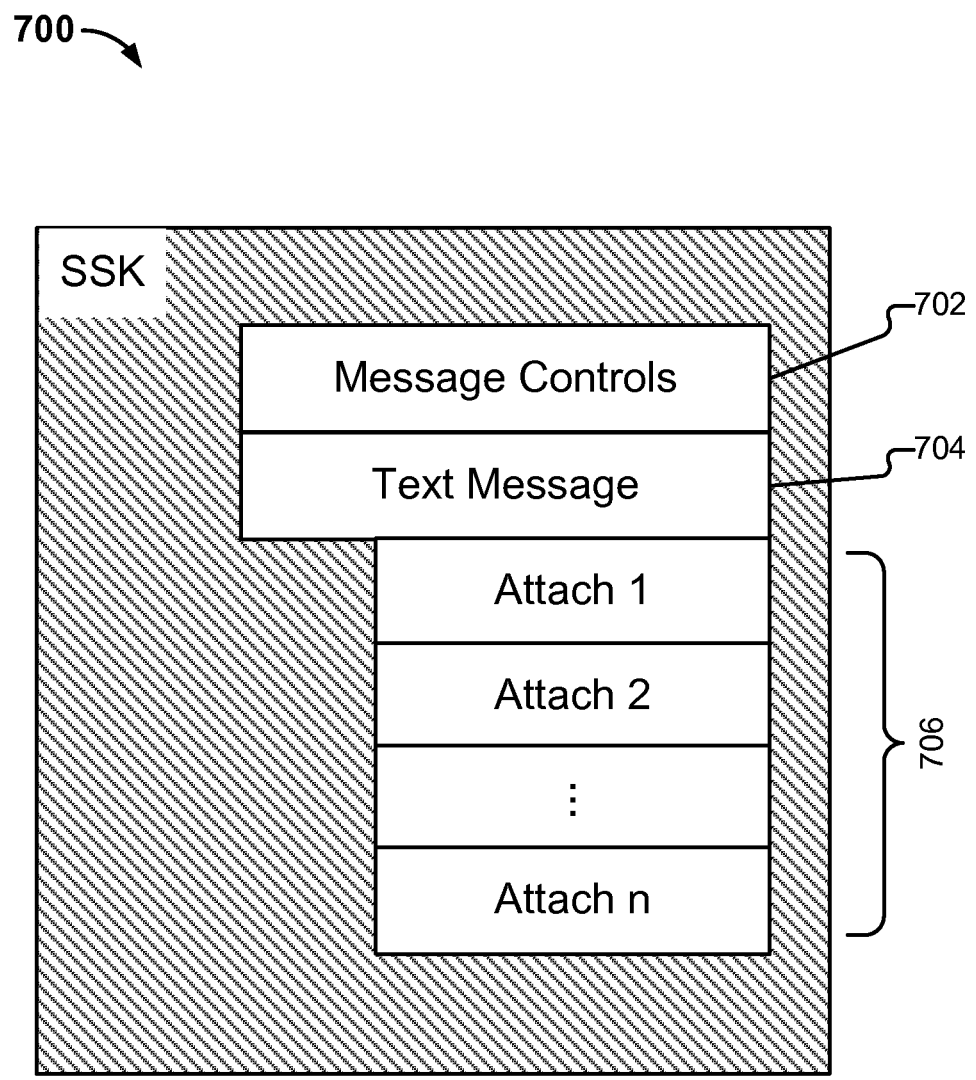
FIG. 7 illustrates an example of a portion of a digital security bubble.
Figure 8:
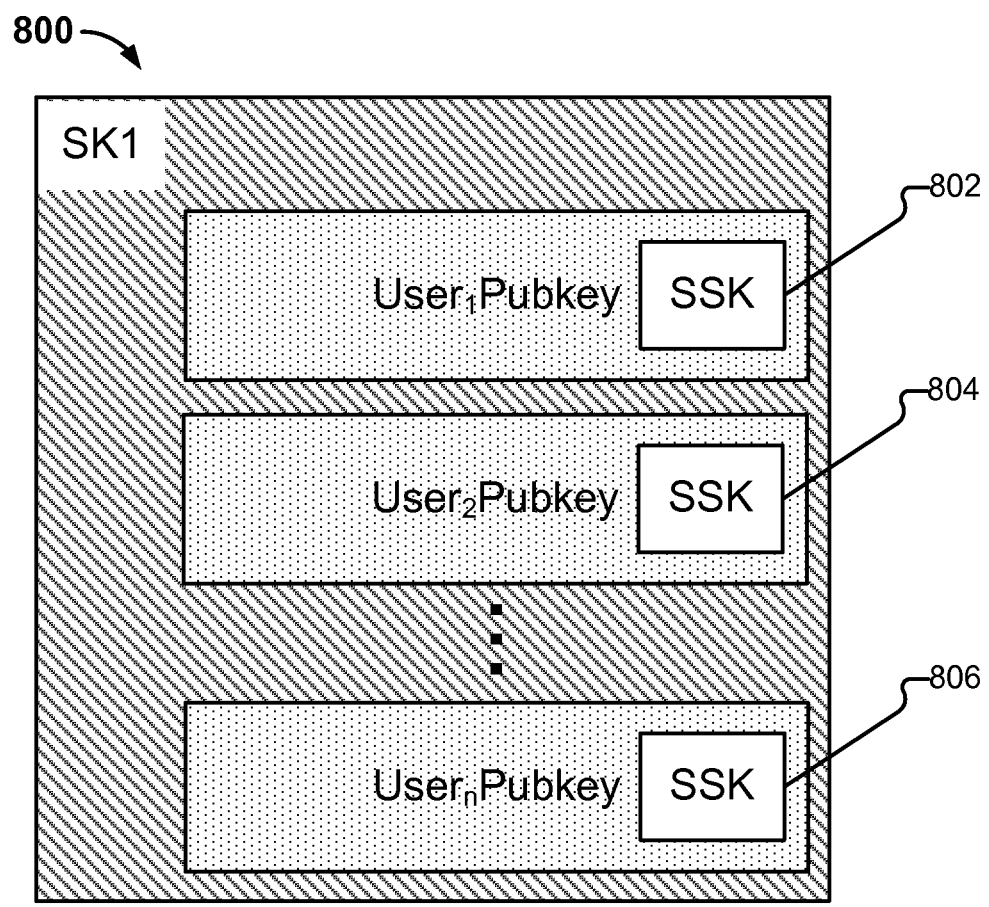
FIG. 8 illustrates an example of a portion of a digital security bubble.
Figure 9:
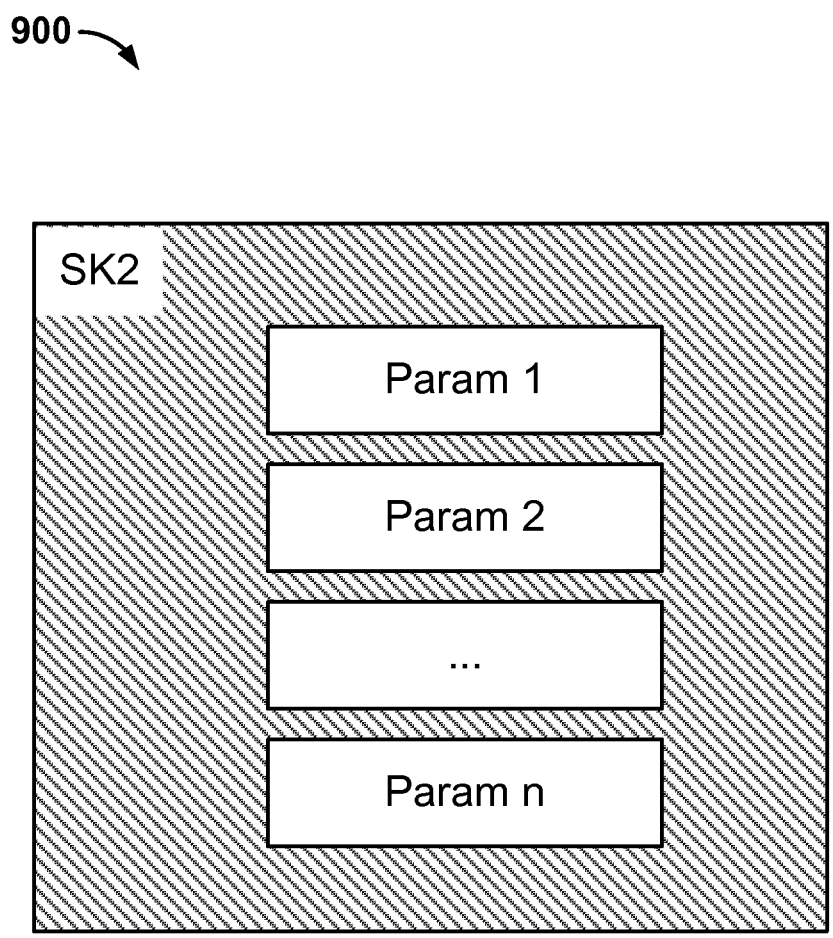
FIG. 9 illustrates an example of a portion of a digital security bubble.

FIGS. 6-9 illustrate additional examples of the construction of an embodiment of a DSB. FIG. 6 illustrates an example of a DSB 600. DSB 600 encapsulates three subcomponents—part 700 (the encrypted message, attachments, and controls), part 800 (the symmetric key encrypted with each recipient's public key), and part 900 (encrypted message parameters). As with DSB 500, a symmetric key (shared by app 116 and platform 102) is used to secure the DSB. In addition, the transmission of the DSB to the server is encapsulated with TLS for an additional security layer. FIG. 7 illustrates part 700 of DSB 600. In particular, part 700 includes the message controls (702), message (704), and attachments (706). Part 700 is encrypted using a shared symmetric key SSK (e.g., $Ek_{1,1}$). FIG. 8 illustrates part 800 of DSB 600. In particular, part 800 includes the shared symmetric key, encrypted to each of the recipients' respective public keys. Further, the collection of encrypted keys (802-806) is encrypted using symmetric key SK1. FIG. 9 illustrates part 900 of DSB 600. In particular, part 900 includes encrypted message parameters. Part 900 is encrypted using symmetric key SK2.

E. Receiving DSB Secured Messages

As mentioned above, Bob is also a user of platform 102. When Bob loads his copy of the messaging app on his smartphone (i.e., app 138 on device 114), the app communicates with platform 102 (e.g., via interface 118) to determine whether Bob has any new messages. Since Alice has sent a message to Bob since he last used app 138, a flag is set in database 120, indicating to app 138 that one or messages are available for download.

Figure 10:
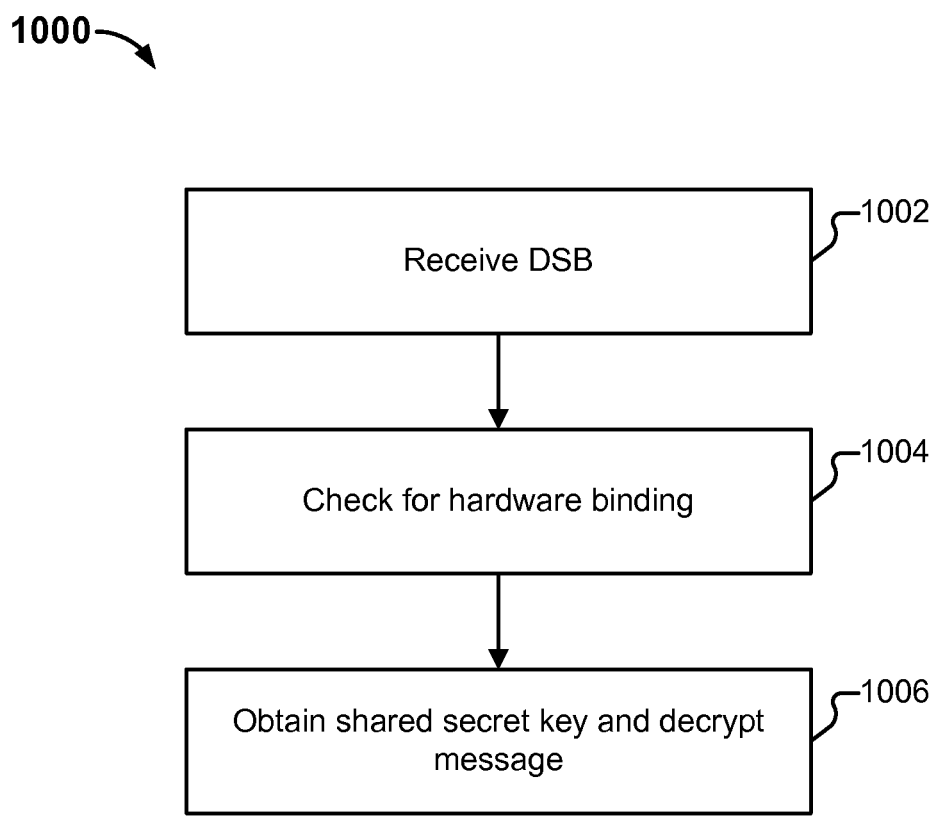
FIG. 10 illustrates an example of a process for accessing a message included inside a digital security bubble.

FIG. 10 illustrates an example of a process for accessing a message included inside a digital security bubble. In some embodiments, process 1000 is performed on a client device, such as Bob's client device 114. The process begins at 1002 when a DSB is received. As one example, a DSB is received at 1002 when app 138 contacts platform 102, determines a flag associated with Bob's account has been set (e.g., indicating he has one or more new messages), and downloads the DSB from platform 102. In such circumstances, upon receipt of the DSB, client 114 is configured to decrypt the DSB using Bob's private key (e.g., generated by Bob at 202 in process 200).

At 1004 (i.e., assuming the decryption was successful), hardware binding parameters are checked. As one example, a determination is made as to whether device information (i.e., collected from device 114) can be used to construct an identical hash to the one included in the received DSB. If the hardware binding parameters fail the check (i.e., an attempt is being made to access Alice's message using Bob's keys on a device that is not Bob's), contents of the DSB will be inaccessible, preventing the decryption of Alice's message. If the hardware binding parameter check is successful, the device is authorized to decrypt the symmetric key (i.e., using Bob's private key generated at 202) which can in turn be used to decrypt Alice's message.

F. Digital Data Sanitization

As illustrated in FIG. 1 and discussed above, a variety of types of devices can make use of techniques described herein, including desktop/laptop computers, tablets/mobile phones, and other types of devices, such as digital cameras, game consoles, video players, and network-connected appliances. Such devices can include a variety of types of hardware storage components (e.g., hard disk drives, solid state drives, and/or removable flash media) in a variety of configurations (e.g., with some devices including a single storage component and other devices including multiple components of the same or different types). Further, such devices can be used for a variety of purposes in addition to/instead of being used to exchange DSB secured messages. For example, computers 108 and 110 can be used to edit and review word processing documents/spreadsheets, consume audiovisual content, and for other general computing purposes. Mobile telephony devices 112 and 114 can be used to send SMS messages, make phone calls, browse web pages, engage in social networking activities, etc. Various applications can be installed on or removed from the various devices, and the various applications (or operating system commands, as applicable) can be used to delete data. For example, a user of computer 110 can review a text document received via an email client installed on that computer and subsequently delete the document using the mail client. As another example, a user of mobile telephony device 112 can place a phone call and subsequently delete a call log associated with the placed call. As yet another example, a user of a gaming console can install a game on the gaming console and then subsequently uninstall the game (deleting personal information collected by the game as part of the uninstall process). As yet another example, a user of a digital camera can take and then delete a set of photographs and/or video clips.

Typically, deleted data remains on a storage medium until it is overwritten by new data. And, data deleted from a device can often be recovered. For example, users of computers 108 and 110 can make use of "undelete" utilities to recover word processing files inadvertently deleted from those computers. As another example, if Alice sells her tablet 106, the purchaser can potentially recover information such as Alice's email, contacts, etc., even if Alice deleted the data prior to selling the device. Using techniques described herein, data once deleted from a device can be sanitized (e.g., rendering it unrecoverable even to one engaging in forensic analysis of the device). Specifically, techniques described herein can be used to digitally sanitize data irrespective of which program deleted the data, and irrespective of what type of data is deleted (e.g., whether the data is a DSB secured message, an email message, an SMS message, an audiovisual file (e.g., picture, video, and/or audio), a call log file, a document, etc.).

Figure 11A:
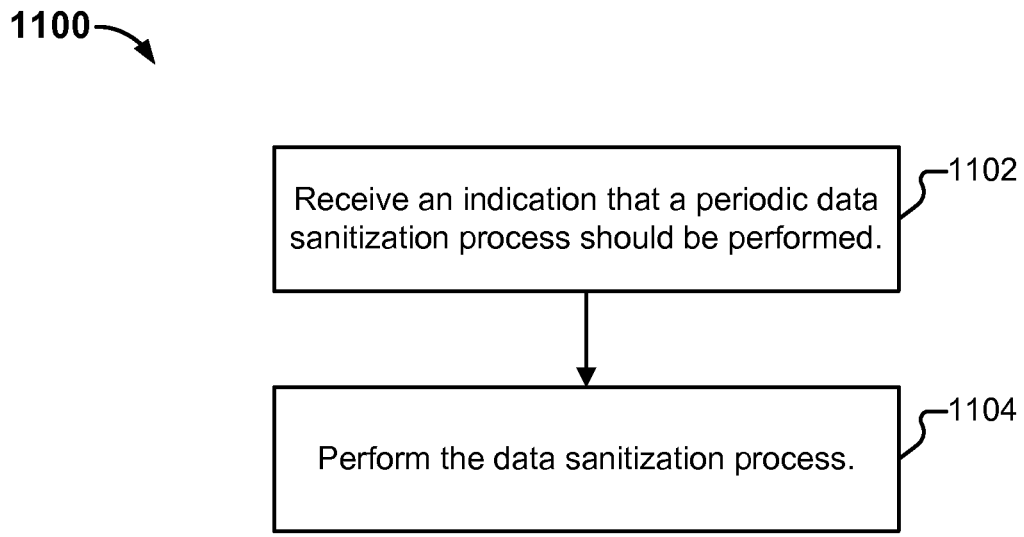
FIG. 11A illustrates an embodiment of a process for initiating digital data sanitization.

FIG. 11A illustrates an embodiment of a process for initiating digital data sanitization. Process 1100 can be performed on a variety of devices, such as client devices 106-114 and other types of client devices described above. For example, a digital camera can be configured to perform process 1100 on the fixed (or removable) media to which audiovisual information is recorded. Further, as will be described in more detail below, the process can be initiated in a variety of ways, including: being automatically initiated by an application, such as the secure messaging application described above (or a different application that does not provide secure messaging functionality), being automatically initiated by the device's operating system, and/or being initiated on demand by a user of the device. In various embodiments, process 1100 is performed continuously (e.g., is running continuously in the background at a low priority level), is performed in a scheduled manner (e.g., running once per hour or once per day), and/or is performed on demand (e.g., in response to a user request). Various triggering events can also be used to initiate the process, such as a determination (e.g., by the operating system) that a threshold amount of data has recently been deleted, that a threshold amount of time has passed since the last time the process was performed, etc. Further, information such as the current resource load on the device can be taken into consideration in adjusting how process 1100 is performed (e.g., how frequently and/or how aggressively).

The process begins at 1102 when an indication that a periodic data sanitization process should be performed is received. As one example, the indication can be received at 1102 by device 106 when Alice launches app 116 on device 106. As another example, the indication can be received at 1102 by device 108 when device 108 is powered on (e.g., where the operating system of device 108 is responsible for executing process 1100 or coordinating the executing of process 1100, or a standalone sanitizing application launched at startup is responsible for executing process 1100). As yet another example, the indication can be received at 1102 by a device such as a video player or video recorder, when a predetermined amount of time has elapsed (e.g., one day or one week). At 1104, the data sanitization process is performed, embodiments of which are described in more detail below.

Figure 11B:
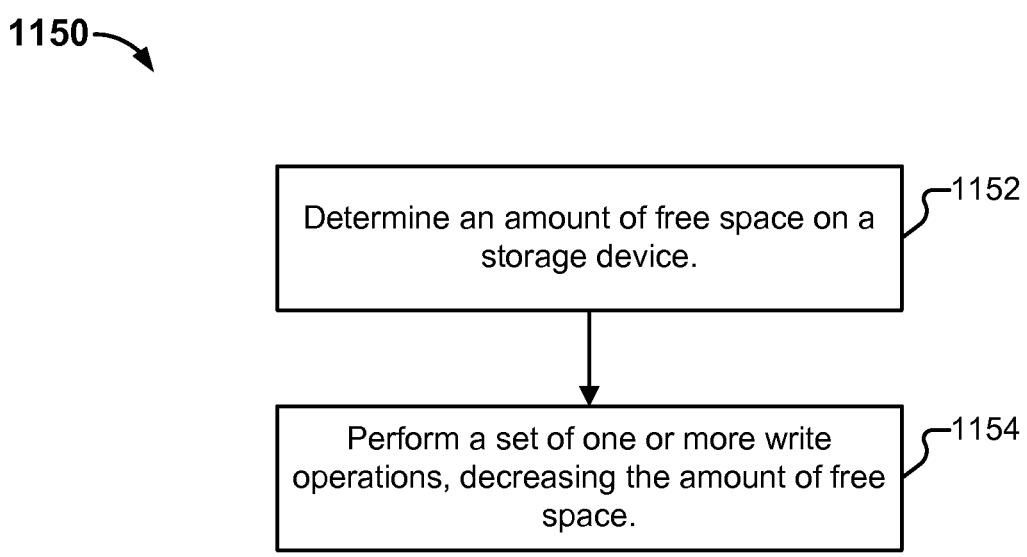
FIG. 11B illustrates an embodiment of a process for digitally sanitizing data.

FIG. 11B illustrates an embodiment of a process for digitally sanitizing data. Process 1150 is an example of processing that is performed at 1104 in process 1100 in various embodiments. Process 1150 begins at 1152 when an amount of free space on a storage device is determined. As one example, suppose Alice's tablet 106 includes a 64G SSD component. Of that 64G of storage, Alice is currently using 14G, and the remaining 50G of storage is considered by device 106's operating system to be free space. Included in the free space are those files (and any other data) recently deleted by Alice. As another example, suppose mobile device 112 is an Android device with 16G fixed storage and an additional 16G of removable storage (e.g., a removable flash card). At 1152, the free space of both the fixed storage and removable storage is determined.

At 1154, a series of write operations is performed, decreasing the amount of available free space. As one example, at 1154, a series of write operations (e.g., of randomly generated data) is performed until all 50G of free space (or a threshold amount of free space) on Alice's device 106 has been overwritten. Once the free space is overwritten, the randomly generated data is deleted, making the space available for use by Alice. The writes can be performed in various locations, as applicable. For example, the writes can be performed in a single temporary directory, and the directory (and its contents) deleted upon completion of the processing. As another example, multiple directories can be used. For example, on a system with multiple storage components, one or more temporary directories on each of the respective components can be written to. Further, where a device includes multiple storage components, process 1150 can be performed at the same time across the multiple components, or can be performed sequentially, as applicable.

Figure 12:
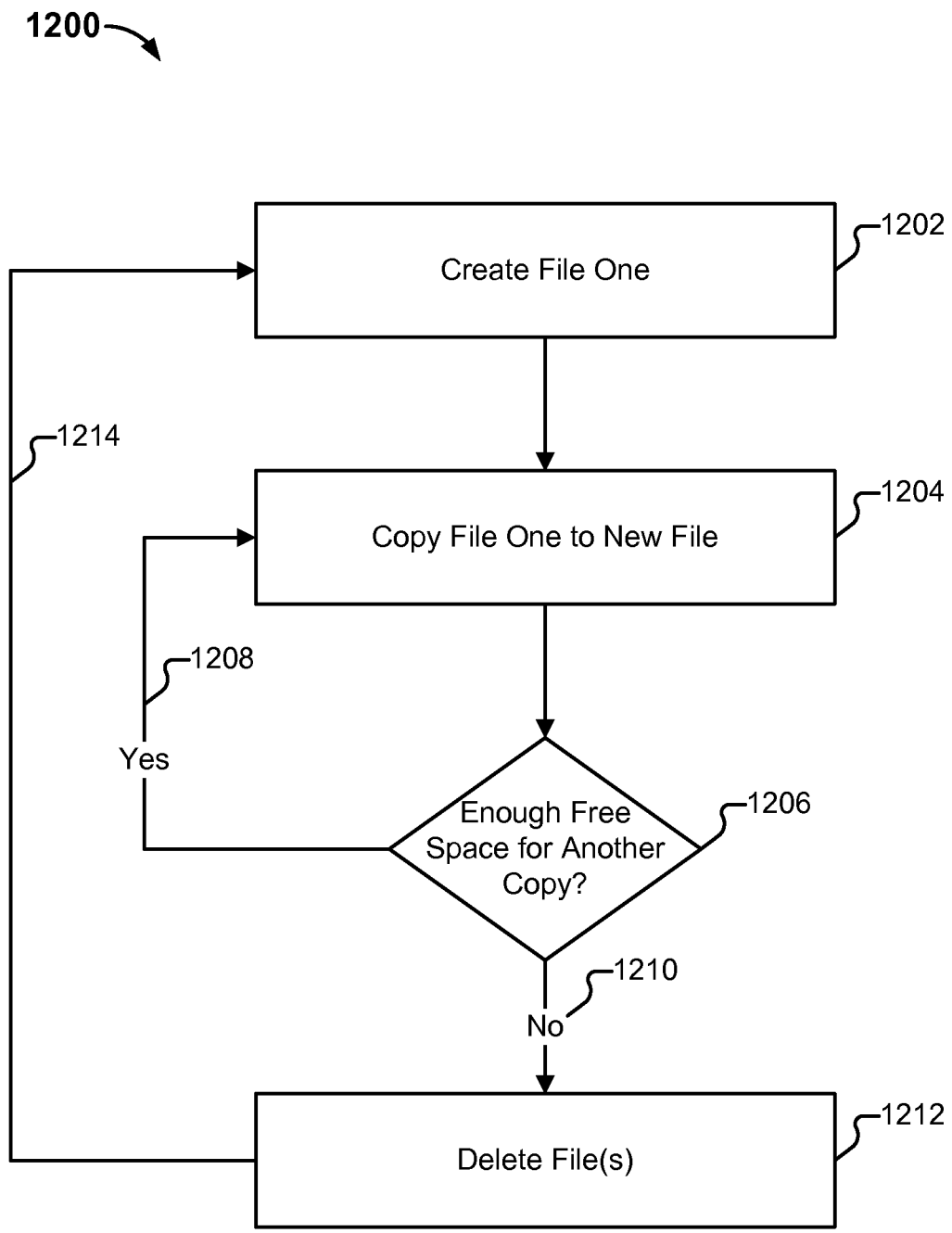
FIG. 12 illustrates an embodiment of a process for digitally sanitizing data.

FIG. 12 illustrates an embodiment of a process for digitally sanitizing data on a device. In some embodiments, process 1200 is automatically initiated when an application, such as app 116, starts. Process 1200 can also be initiated manually (e.g., at the request of a user), automatically initiated by the operating system of the device, or otherwise initiated (e.g., in response to the occurrence of one or more conditions, examples of which are provided above).

At 1202, a first file is created. As one example, at 1202, a file containing random data is created on Alice's device (e.g., by using a platform-provided random data generator, or a software-implemented random data generator, etc., as applicable, as a source of randomness). The size of the file can be made dependent on one or more of a variety of factors, including the amount of free space available on the device, the total storage capacity of the device, and an "aggressiveness" setting that controls the level of device resources to be used in performing process 1200 (e.g., battery, CPU, and/or other usage). For example, in the case of Alice's device 106, the file created at 1202 could be 50M (e.g., where Alice has indicated that she would like minimal aggressiveness). As another example, the file created at 1202 could be much larger (e.g., where process 1200 is performed on a desktop computer having a 500G of free space, or where Alice has indicated she would like maximum aggressiveness and/or would like an on-demand sanitization). The file created at 1202 could also be smaller (e.g., where process 1200 is performed on a small flash drive, or where Alice has indicated she would like minimum aggressiveness).

At 1204, a copy of the file created at 1202 is made (e.g., resulting in two total files of identical content). Typically, copying the file created at 1202 into a new file will take less computing resources than generating a second file of different random data (i.e., repeating portion 1202 of the process). In alternate embodiments, instead of copying the file created at 1202, at 1204, an additional file of random data is created.

At 1206, a determination is made as to whether a sufficient amount of free space remains on the device to hold another file (e.g., to hold another copy of the file created at 1202). Returning to the example of Alice and device 106, a determination is made at 1206 as to whether at least 50M of free space remain on the device. If so (1208) another copy of the file is created (1204), consuming additional free space. If not (1210) the files created at 1202 and 1204 are deleted (1212), resulting in free space. In some embodiments, instead of determining whether sufficient space exists for another copy (1206), portion 1204 of the process continues until the device generates an error indicating that insufficient space remains to perform an additional copy. In that case, portion 1206 is adapted or omitted as applicable.

In some embodiments, process 1200 is performed continuously (e.g., while app 116 is open—and until it closes, or as a system process), and, once the files are deleted at 1212, an additional cycle of process 1200 is performed (1214). In other embodiments, process 1200 terminates after one cycle (e.g., terminates once portion 1212 is reached and the file(s) are deleted), or a predetermined number of cycles (e.g., terminates once portion 1212 is reached three times).

Further, in some embodiments multiple instances of process 1200 (or portions thereof) are performed at the same time. For example, in some embodiments instead of creating a single file at 1202, five files are created at 1202. Copies of those five files (created at 1202) are respectively made at 1204, and continue to be made, until the free space on the device is depleted.

Figure 13:
FIG. 13 illustrates an embodiment of an interface.

FIG. 13 illustrates an embodiment of an interface. Interface 1300 is an example of an interface that is shown to Alice in embodiments of app 116. As shown in region 1302, Alice can turn "auto mode" on and off. When auto mode is on, process 1200 will be started whenever app 116 starts, and will run continuously until app 116 is closed. When auto mode is off, process 1200 will not be performed unless Alice selects "run now" option 1304, which will initiate a manual start of process 1200. In region 1306, Alice can specify how aggressive she would like the sanitization process to be. A lower aggressiveness setting will use a smaller file size for the file created at 1202 (and consume fewer system resources, e.g., by requiring less processing power to generate the smaller random file, and by executing only when the load on the device is below a threshold—but also take longer to complete). A higher aggressiveness setting will use a larger file size for the file created at 1202 (and complete more quickly, at the cost of consuming more battery, or other system resources). In various embodiments, the aggressiveness setting is automatically adjusted in response to a change in a system condition. For example, if the device includes a battery and the battery drops below a threshold charge level, the aggressiveness level can be automatically adjusted, the data sanitization process can be paused, an alert can be generated asking the user whether the aggressiveness level should be adjusted, etc.

Figure 14:
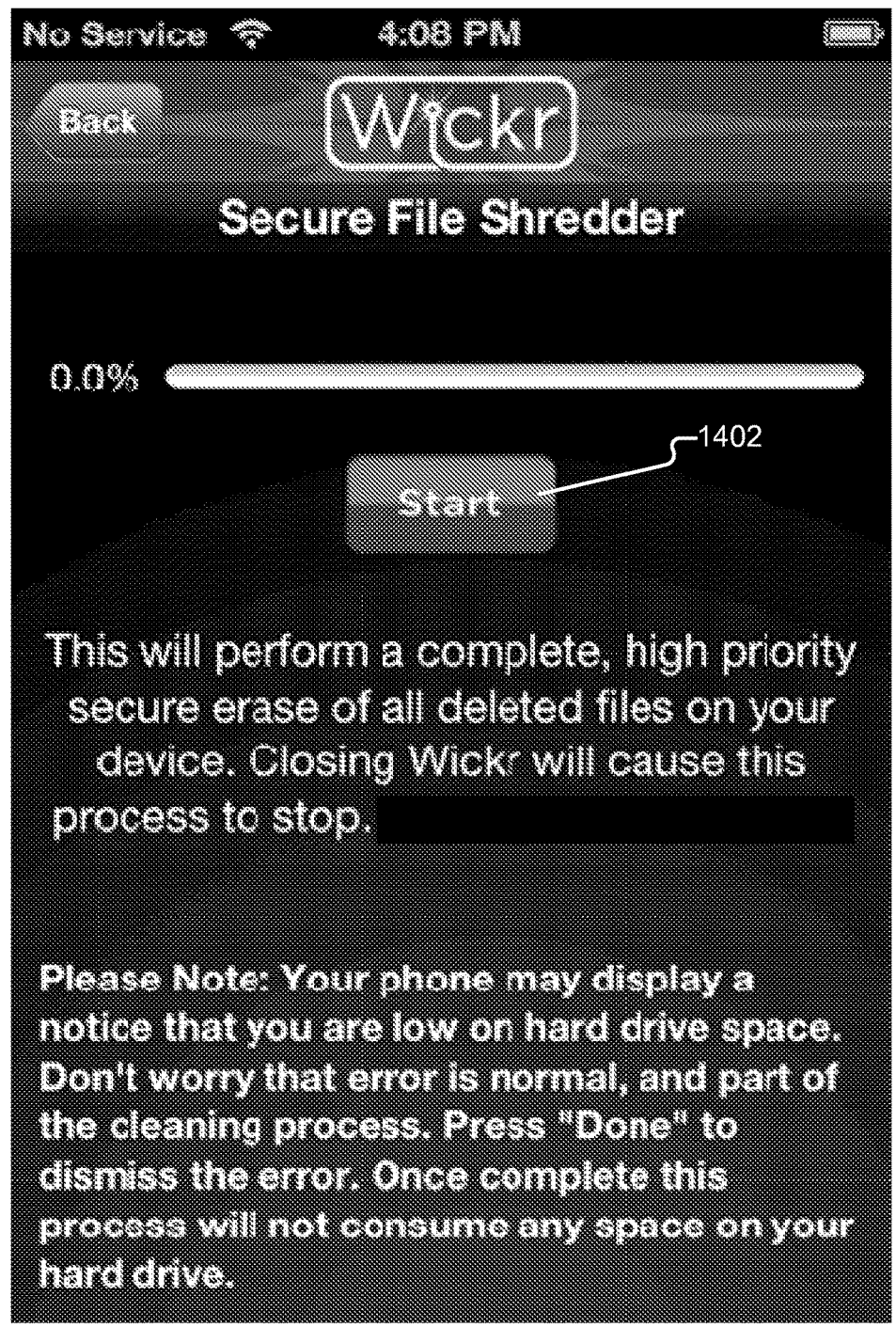
FIG. 14 illustrates an embodiment of an interface.

FIG. 14 illustrates an embodiment of an interface. Interface 1400 is an example of an interface that can be shown to Alice in embodiments of app 116. In particular, Alice is shown interface 1400 after clicking on option 1304 in the interface shown in FIG. 13. When Alice clicks on "start" button 1402, a single iteration of process 1200 is performed (e.g., using the maximum aggressiveness level).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for sanitizing a storage medium, the method comprising:
   determining, by a first device, an amount of free space on the storage medium;
   writing, by the first device, a first file to the free space on the storage medium until the amount of free space on the storage medium decreases to a threshold amount, wherein a size of the first file is proportional to an aggressiveness setting associated with the sanitization of the storage medium;
   providing, by the first device, an error indicating there is insufficient space to perform an additional write operation when the amount of free space decreases to the threshold amount; and
   deleting, by the first device, the one or more first files from the free space on the storage medium to make the free space available for storage.

2. The method of claim 1, wherein the free space on the storage medium includes at least one recently deleted file.

3. The method of claim 1, wherein the storage medium includes at least one of a fixed storage medium and a removable storage medium.

4. The method of claim 1, comprising:
   adjusting, by the first device, the aggressiveness setting based, in part, on an availability of system resources.

5. The method of claim 1, comprising:
   receiving, by the first device, a request to initiate the sanitation of the storage medium.

6. The method of claim 1, wherein the first file is a temporary file that includes random data.

7. The method of claim 1, comprising:
   writing, in addition to the first file, at least one second file to the free space on the storage medium to decrease the amount of free space to the threshold amount.

8. A system for sanitizing a storage medium, the system comprising:
   a memory that includes an amount of free space, wherein the free space includes at least one recently deleted file;
   a processor configured to determine the amount of free space on the memory; write a first file to the free space on the memory until the amount of free space decreases to a threshold amount, wherein a size of the first file is proportional to an aggressiveness setting associated with the sanitization of the memory; receive an error that there is insufficient space to perform an additional write operation; and delete the one or more first files from the free space on the memory to make the free space available for storage.

9. The system of claim 8, wherein the processor is further configured to adjust the aggressiveness setting based, in part, on an availability of system resources.

10. The system of claim 8, wherein the processor is further configured to receive a request to initiate the sanitation of the memory.

11. The system of claim 8, wherein the processor is further configured to write at least one second file to the memory in addition to the one or more first files.

12. A non-transitory computer readable medium comprising instructions that, when executed by at least one processor, perform the steps of:
   determining an amount of free space on a storage medium;
   writing a first file to the free space on the storage medium until the amount of free space on the storage medium decreases to a threshold amount, wherein a size of the first file is proportional to an aggressiveness setting associated with the sanitization of the storage medium;
   providing an error indicating there is insufficient space to perform an additional write operation when the amount of free space decreases to the threshold amount; and deleting the one or more first files from the free space on the storage medium to make the free space available for storage.

13. The non-transitory computer-readable medium of claim 12, wherein the free space on the storage medium includes at least one recently deleted file.

14. The non-transitory computer-readable medium of claim 12, wherein the storage medium includes at least one of a fixed storage medium and a removable storage medium.

15. The non-transitory computer-readable medium of claim 12, comprising instructions for:
   adjusting the aggressiveness setting based, in part, on an availability of system resources.

16. The non-transitory computer-readable medium of claim 12, comprising instructions for:
   receiving a request to initiate the sanitation of the storage medium.

17. The non-transitory computer-readable medium of claim 12, wherein the first file is a temporary file that includes random data.

18. The non-transitory computer-readable medium of claim 12, comprising instructions for:
   writing, in addition to the first file, at least one second file to the free space on the storage medium to decrease the amount of free space to the threshold amount.

* * * * *